United States Patent
Santiago et al.

(10) Patent No.: US 12,350,879 B2
(45) Date of Patent: Jul. 8, 2025

(54) METHOD OF ADDITIVELY MANUFACTURING TRANSPARENT LENSES FOR LUMINARIES

(71) Applicant: Eaton Intelligent Power Limited, Dublin 4 (IE)

(72) Inventors: Jeremy M. Baerga Santiago, Southfield, MI (US); Namrata Salunke, Farmington Hills, MI (US); Javed Mapkar, Northville, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 427 days.

(21) Appl. No.: 17/307,423

(22) Filed: May 4, 2021

(65) Prior Publication Data

US 2021/0370584 A1 Dec. 2, 2021

Related U.S. Application Data

(60) Provisional application No. 63/020,574, filed on May 6, 2020.

(51) Int. Cl.
*B29C 64/118* (2017.01)
*B29C 64/188* (2017.01)
(Continued)

(52) U.S. Cl.
CPC .......... *B29C 64/118* (2017.08); *B29C 64/188* (2017.08); *B29C 64/393* (2017.08);
(Continued)

(58) Field of Classification Search
CPC ... B29C 64/118; B29C 64/188; B29C 64/393; B29C 64/40; B33Y 10/00; B33Y 50/02;
(Continued)

(56) References Cited

U.S. PATENT DOCUMENTS 10,274,161 B2    4/2019  Vissenberg et al.
10,780,654 B2 *  9/2020  Van Bommel ......... B33Y 80/00
(Continued)

FOREIGN PATENT DOCUMENTS

CN    107666999 A    2/2018
CN    109874325 A    6/2019
(Continued)

OTHER PUBLICATIONS

International Search Report and Written Opinion Issued in International Application No. PCT/EP2021/025173, Mailed Aug. 10, 2021, 13 Pages.
(Continued)

*Primary Examiner* — Michael P Wieczorek
(74) *Attorney, Agent, or Firm* — Talem IP Law, LLP

(57) ABSTRACT

A method of manufacturing a three-dimensional lens comprises inputting a lens template into a controller, depositing a first layer of lens material onto a work surface according to the lens Template, and successively depositing additional filamentous layers of the lens material onto the first layer. The deposition of layers of lens material is done according to the lens template in order to build the three-dimensional lens with a particular transmission scattering profile for transmitted light.

15 Claims, 14 Drawing Sheets

(51) Int. Cl.
    *B29C 64/393*     (2017.01)
    *B29C 64/40*     (2017.01)
    *B29D 11/00*     (2006.01)
    *B29K 77/00*     (2006.01)
    *B33Y 10/00*     (2015.01)
    *B33Y 40/20*     (2020.01)
    *B33Y 50/02*     (2015.01)
    *B29L 11/00*     (2006.01)
    *B33Y 70/10*     (2020.01)
    *B33Y 80/00*     (2015.01)

(52) U.S. Cl.
    CPC ........ *B29C 64/40* (2017.08); *B29D 11/00432* (2013.01); *B29K 2077/00* (2013.01); *B29L 2011/0016* (2013.01); *B33Y 10/00* (2014.12); *B33Y 40/20* (2020.01); *B33Y 50/02* (2014.12); *B33Y 70/10* (2020.01); *B33Y 80/00* (2014.12)

(58) Field of Classification Search
    CPC .............. B33Y 40/20; B29D 11/00432; B29D 11/00009; B29K 2077/00
    See application file for complete search history.

(56) References Cited

U.S. PATENT DOCUMENTS

| | | |
|---|---|---|
| 2017/0031059 A1 | 2/2017 | Valeri et al. |
| 2018/0009134 A1* | 1/2018 | Berben ................ B29C 64/188 |
| 2018/0126620 A1 | 5/2018 | Talgorn et al. |
| 2018/0319087 A1* | 11/2018 | Eom ..................... B29C 64/106 |
| 2018/0320858 A1 | 11/2018 | Boonekamp et al. |
| 2018/0370131 A1 | 12/2018 | Ishikawa et al. |
| 2019/0110366 A1 | 4/2019 | Gavagnin et al. |
| 2019/0186841 A1 | 6/2019 | Sharma et al. |
| 2019/0210278 A1 | 7/2019 | Hikmet et al. |
| 2020/0114572 A1 | 4/2020 | Hikmet et al. |

FOREIGN PATENT DOCUMENTS

| | | |
|---|---|---|
| CN | 110869195 A | 3/2020 |
| WO | 2016/207305 A1 | 12/2016 |
| WO | 2018/087061 A1 | 5/2018 |
| WO | 2019201671 A1 | 10/2019 |
| WO | 2020064375 A1 | 4/2020 |

OTHER PUBLICATIONS

Office Action issued in Chinese Application No. 202180032618.4, Mailed Feb. 25, 2025, 22 pages.

\* cited by examiner

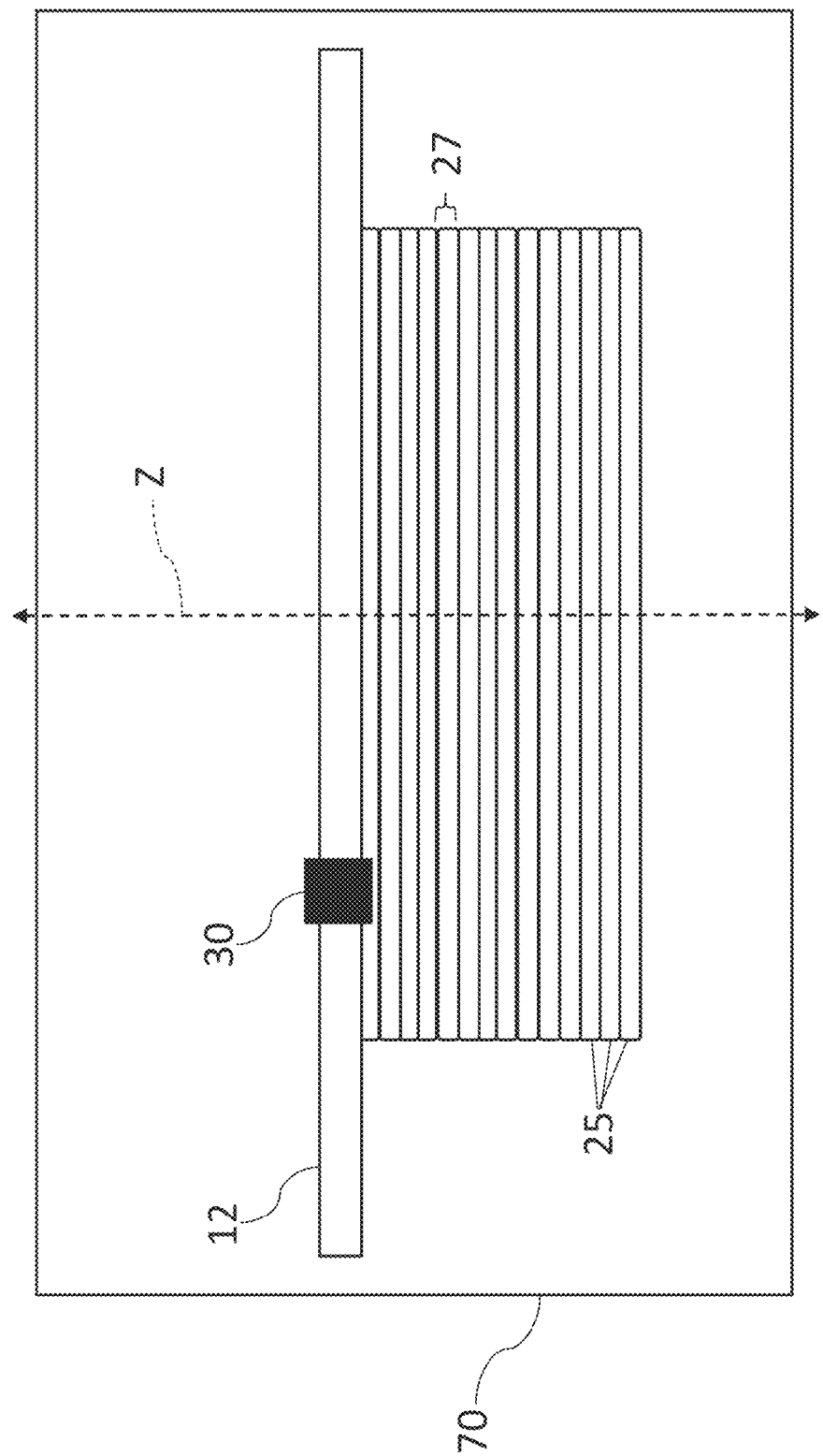

FIG. 5A-2 ical field

METHOD OF ADDITIVELY MANUFACTURING TRANSPARENT LENSES FOR LUMINARIES

CROSS-REFERENCE TO RELATED APPLICATIONS

This non-provisional patent application claims priority to, and the benefit of U.S. Patent Application No. 63/020,574, filed May 6, 2020. The entire contents of said application is hereby incorporated by reference.

The disclosed invention was made with Government support under Cooperative Agreement #DE-EE0008722 awarded by the Department of Energy. The Government has certain rights in this invention. The present disclosure relates to a method of manufacturing transparent lenses for luminaries using an additive manufacturing process. More specifically, the present disclosure relates to a method of manufacturing transparent polyamide lenses for luminaries using fused deposition modeling (FDM).

TECHNICAL FIELD

Background

The production of silicone-based lenses for luminaries or LED fixtures is done using known molding or extrusion techniques. Using such molding techniques to produce differently shaped and/or sized lenses requires the use of different molds and mold tools. This results in high production cost for such lenses and extensive lead times when shifting production between differently shaped and/or sized lenses. Consequently, the design freedom for these molded lenses is very limited as each different lens requires a new set of molds.

These are just some of shortcomings that exist with current methods of manufacturing transparent lenses for luminaries.

SUMMARY

An embodiment of a method of manufacturing a three-dimensional lens for a luminary uses an additive manufacturing process. The method comprises inputting a lens template into a controller, depositing a first filamentous layer of transparent polyamide material onto a work surface according to the lens template, and successively depositing additional filamentous layers of the transparent polyamide material onto the first layer according to the lens template to build the three-dimensional lens. The lens template further comprises a transmission scattering profile for transmitted light.

In an embodiment, the method further comprises at least one post-printing process. In an embodiment, one or more fillers are added to the transparent polyamide material in order to control softness of the transmitted light. In an embodiment, the transparent polyamide material is tinted a color. In an embodiment, the three-dimensional lens comprises one or more smooth surfaces. In another embodiment, at least a portion of the three-dimensional lens is built on a support material, and the support material is removed after the depositing of the transparent polyamide material is completed. In a further embodiment, the first filamentous layer and the additional filamentous layers are substantially parallel to each other.

Another embodiment of a method of manufacturing a three-dimensional lens comprises inputting a lens template into a controller, depositing a first layer of lens material onto a work surface according to the lens template, and successively depositing additional layers of the lens material onto the first layer according to the lens template to build the three-dimensional lens. The lens template further comprises a transmission scattering profile for transmitted light. In an embodiment, the three-dimensional lens is for a luminary. In an embodiment, the method further comprises at least one post-printing process. In an embodiment, at least a portion of the three-dimensional lens is built on a support material, and the support material is removed after the depositing of the lens material is completed. In an embodiment, the first layer and the additional layers are substantially parallel to each other. In an embodiment, the lens material is a transparent polyamide. In an embodiment, the transparent polyamide material comprises one or more fillers in order to control softness of the transmitted light. In an embodiment, the transparent polyamide material is tinted a color.

BRIEF DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which:

FIG. 3B is another schematic depiction

FIGS. 5A-1 and 5A-2 illustrate an example of a transmission scattering pattern of a printed smooth surface with the nozzle of the FDM printing device set at +45°;

FIGS. 5B-1 and 5B-2 illustrate an example of a transmission scattering pattern of a printed rough surface with the nozzle of the FDM printing device set at −45°;

DETAILED DESCRIPTION

The following description relates to various embodiments of a method of additively manufacturing transparent polyamide lenses for luminaries. It will be readily apparent that these embodiments are merely examples and that numerous variations and modifications are possible that embody the inventive aspects discussed herein. Several terms are used throughout this description to describe the salient features of the invention in conjunction with the accompanying figures. These terms, which may include "first", "second", "inner", "outer", and the like are not intended to overly limit the scope of the invention, unless so specifically indicated. The terms "about" or "approximately" as used herein may refer to a range of 80%-125% of the claimed or disclosed value. With regard to the drawings, their purpose is to depict salient features of the method of additively manufacturing transparent polyamide lenses for luminaries and are not specifically provided to scale.

Figure 1:
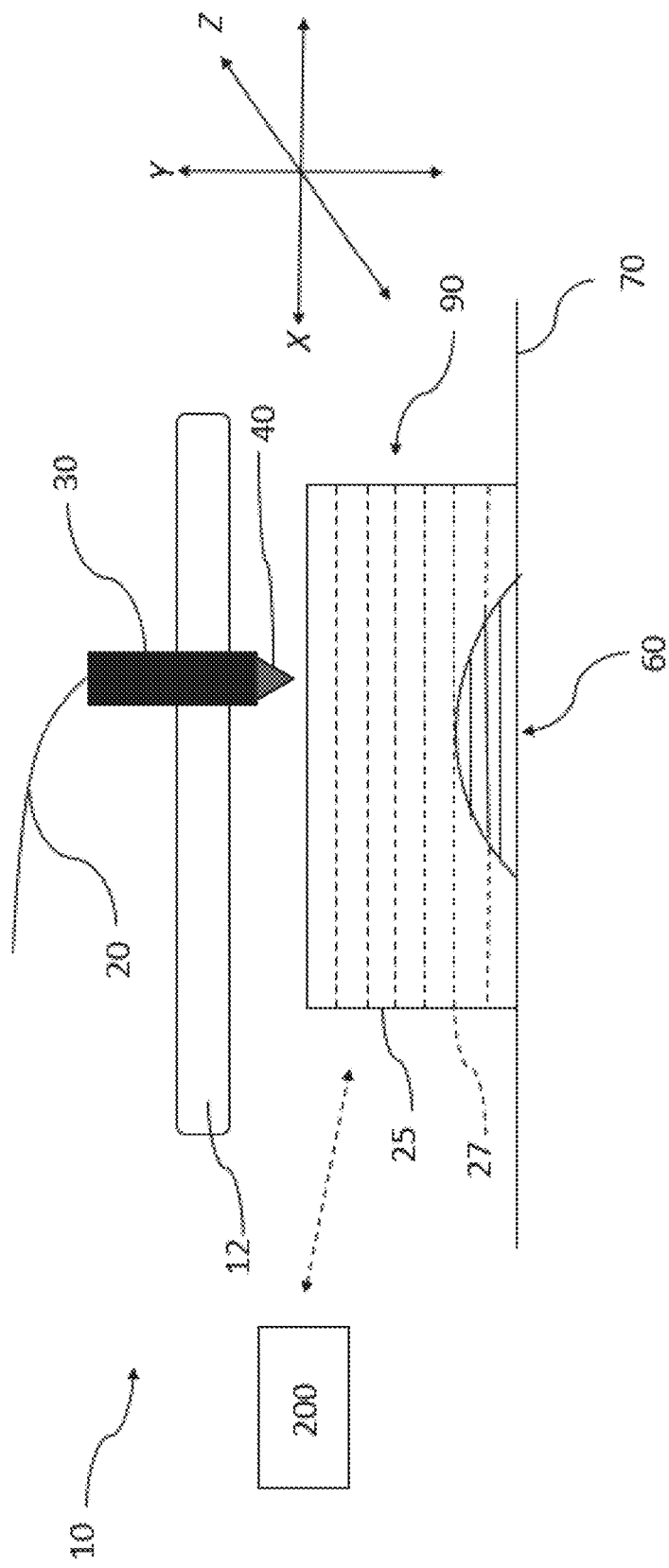
FIG. 1 is a schematic depiction of an example of an FDM printing device depositing printed material.
Figure 2A:
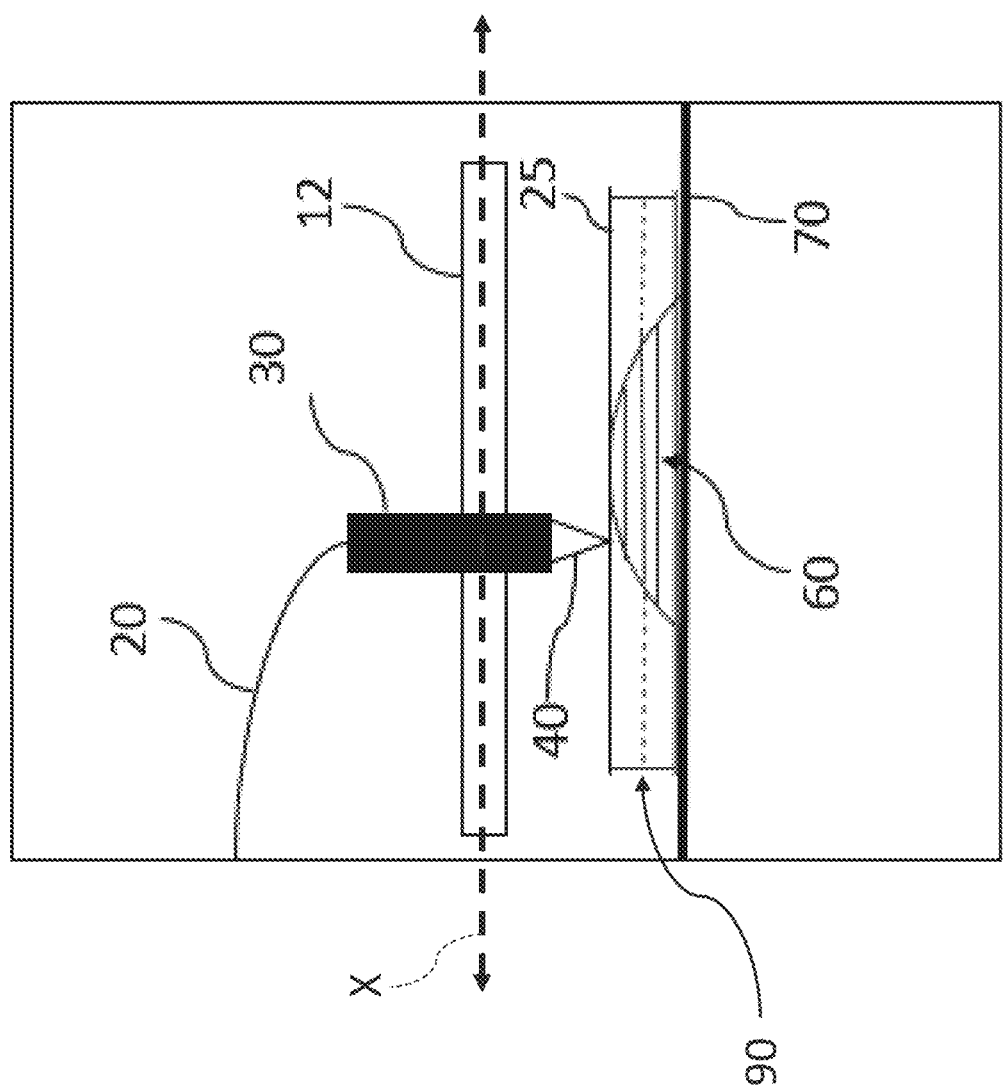
FIGS. 2A-C are schematic depiction of the material deposition during various stages of the FDM printing process.
Figure 2B:
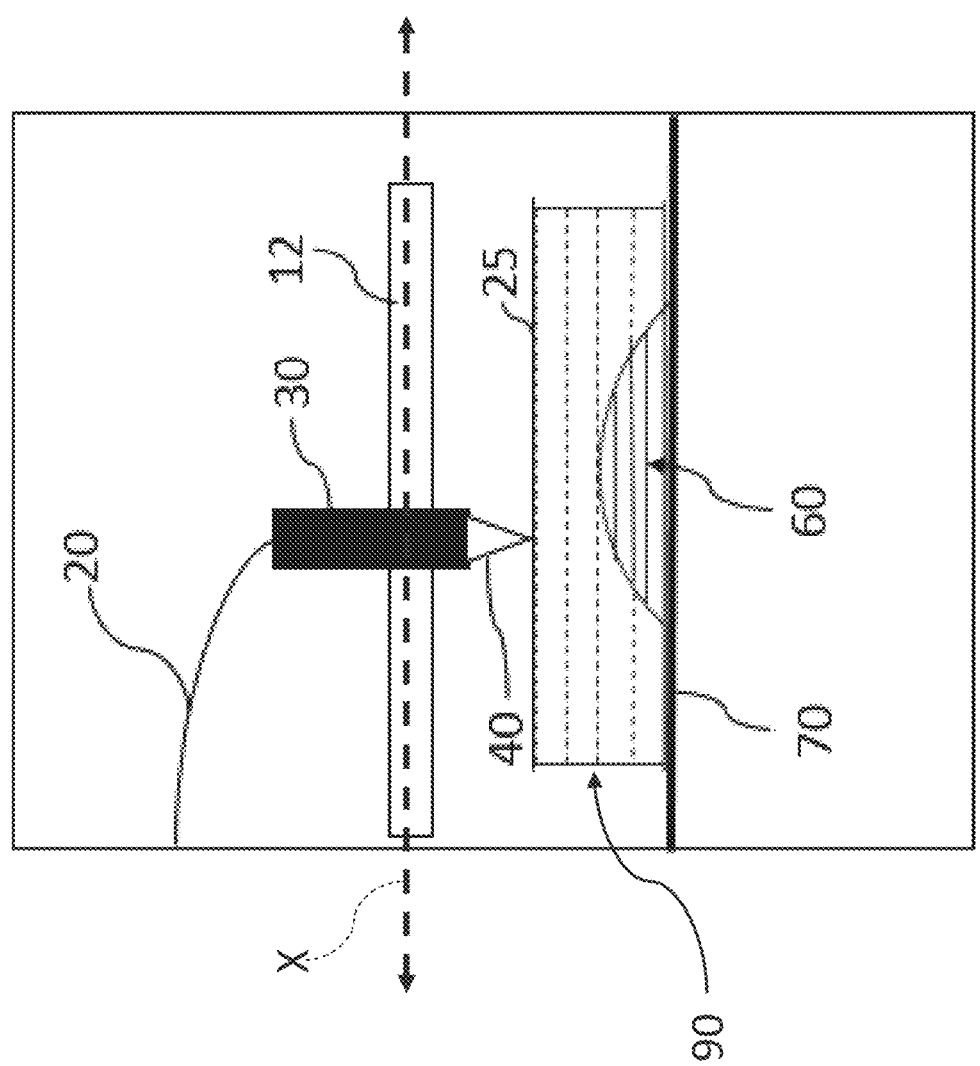
Figure 2C:
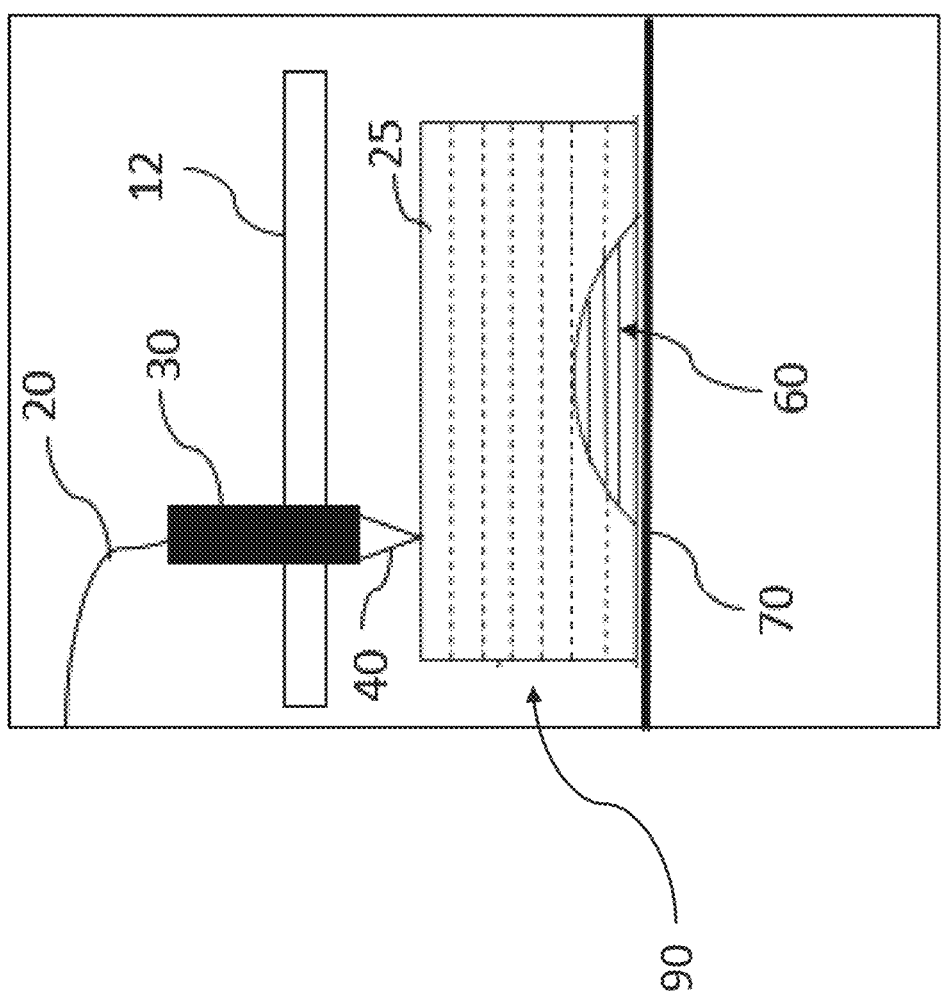
Figures 1, 5A:
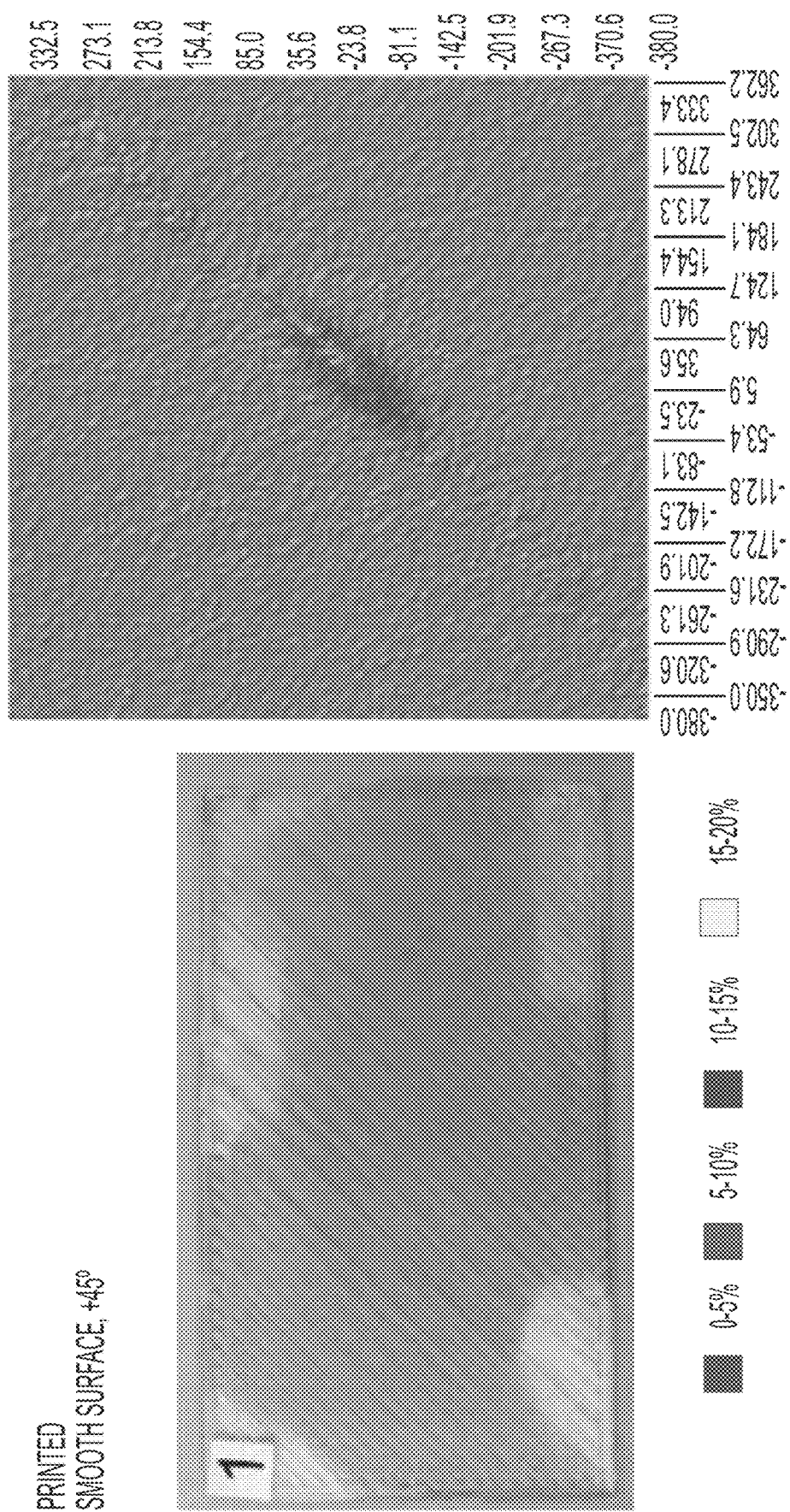
Figures 1, 5B:
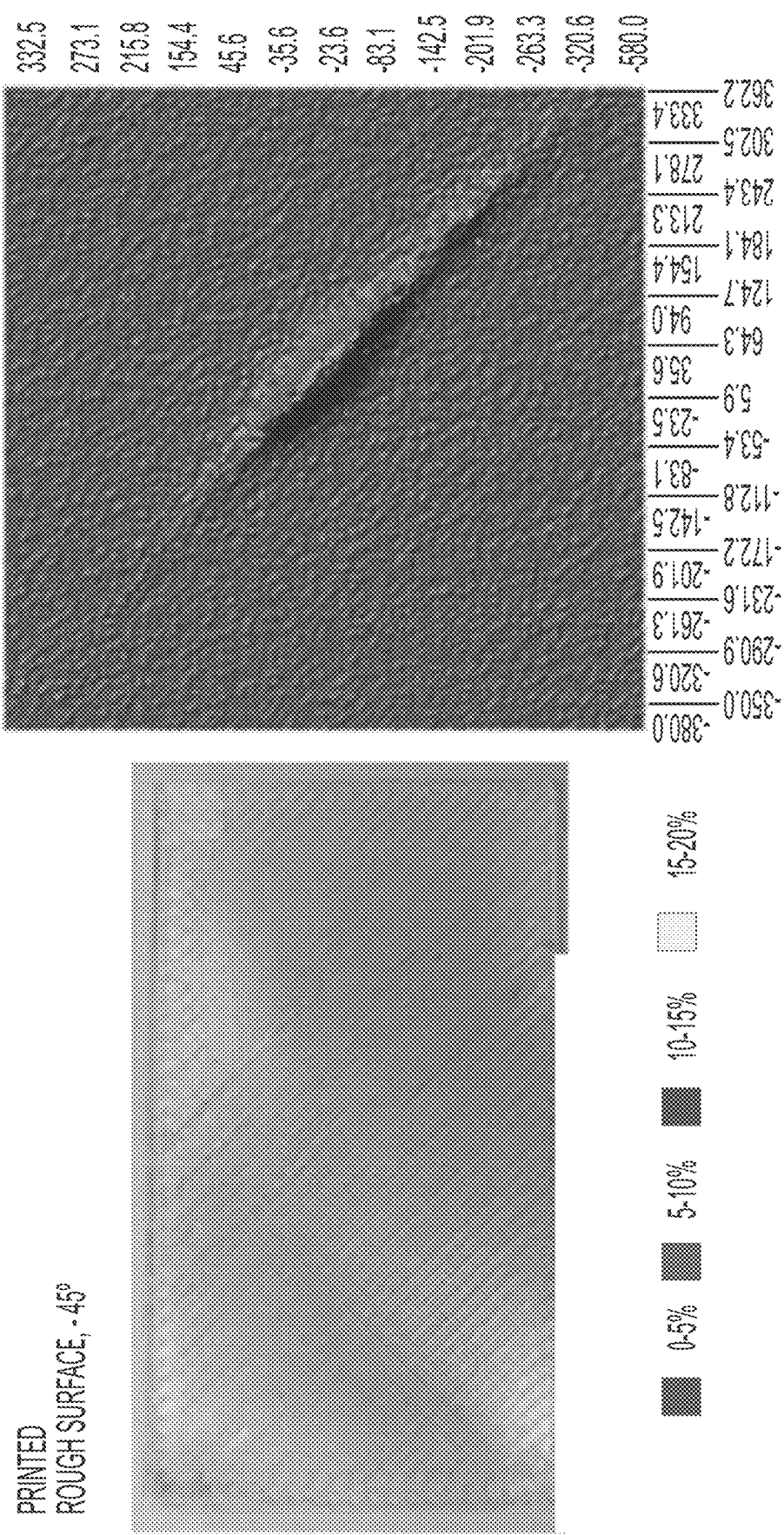
Figures 2, 5B:
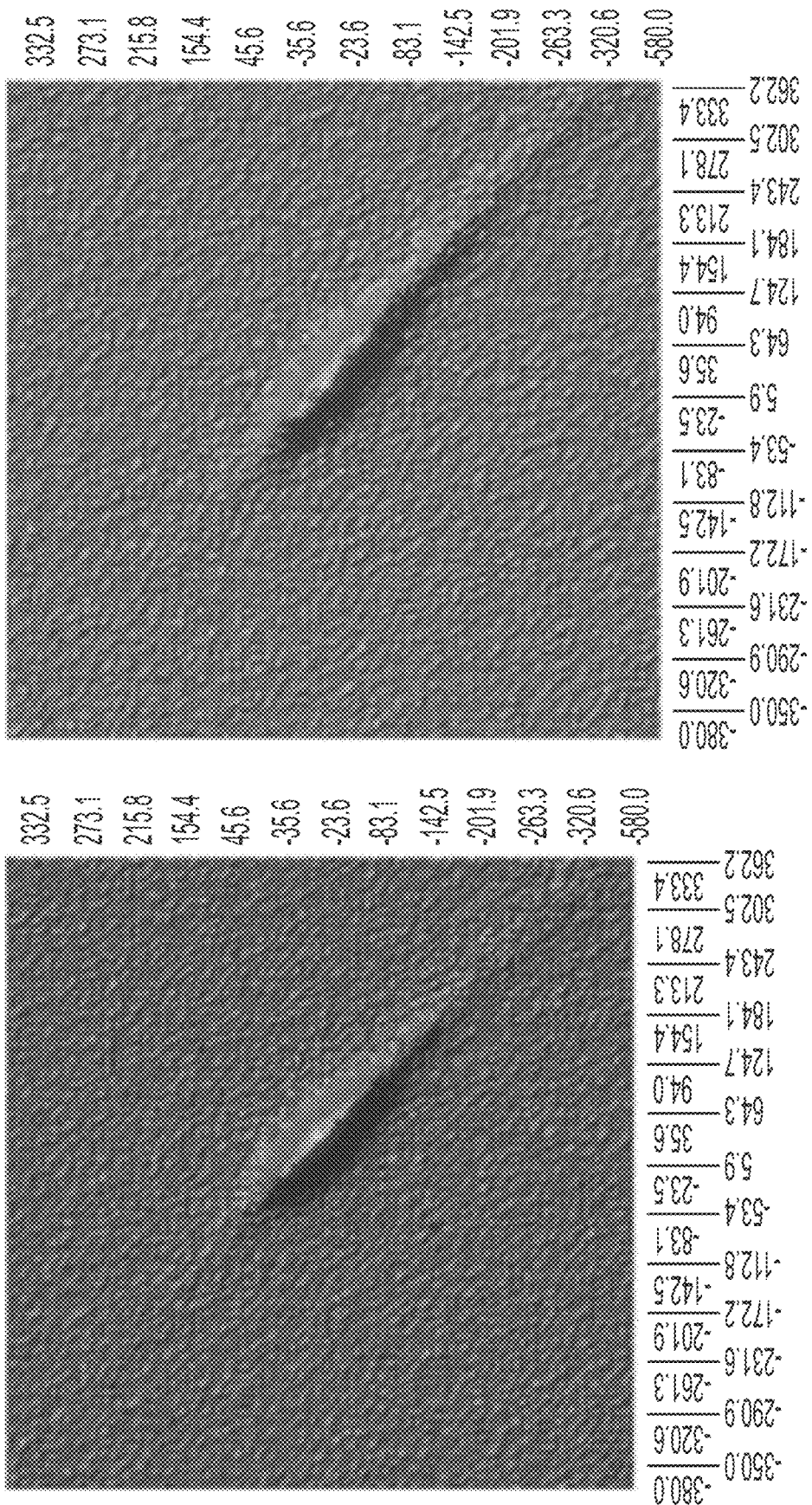

A schematic example of a device used for fused filament fabrication or fused deposition modeling (FDM) is illustrated in FIGS. 1-2C. Filamentous material 20 is fed into an FDM printer 10 where it is heated, melted, and extruded through one or more nozzles 40 positioned on an extrusion head 30. The melted filamentous material or "printed material" 25 (or lens material) is then deposited in layers 27 according to a predetermined template to form a three-dimensional lens 90. The predetermined template or operating instructions are preloaded into a controller 200 of the FDM printer 10 and specifies the printing parameters of the lens 90 being printed, such as the shape, thickness, and the composition. In order to switch production to a differently shaped and/or sized lens, a new set of instructions is input into the controller 200 and possibly one or more nozzles 40 are changed. This means that there is a relatively short interruption on the production before the differently shaped lenses are able to be fabricated and an increase in the design freedom of the lenses. In contrast when a molding process is used, changing the production to a differently shaped lens requires a complete retooling and/or the creation of new molds. This drastically increases lag time and cost, which in turn decreases design freedom.

In the embodiments discussed, the lenses are comprised of a transparent polyamide material that is impact resistant, has a high glass transition temperature, and also has a high light transmission as compared with the acrylic materials traditionally used to mold lenses. Examples of such a material are nylon and an aliphatic amorphous polyamide (ISO 1874 nomenclature PA PACM12). Table 1 below compares certain properties of an aliphatic amorphous polyamide (AAP) with those of the typical acrylic material.

TABLE 1

|  | AAP | Acrylic |
| --- | --- | --- |
| Impact (Charpy V-notch test) | 1.6 J/cm$^2$ | 0.08 J/cm$^2$ |
| Glass Transition Temp. | 140° C. | 105° C. |
| Light Transmission (Molded Material) | 90% | 92% |
| Chemical Resistance | Excellent | Fair |

The FDM printing of a transparent polyamide lens also offers several benefits over stereolithography printing techniques such as decreased or no product degradation due to ultraviolet exposure, and an increased resistance to a wide range of chemicals. All of these properties of the FDM printed transparent polyamide lenses are especially desirable for producing lenses luminaries to be used in environments classified as hazardous.

Referring to FIG. 1, the layers 27 of printed material 25 may be deposited directly onto a work surface 70 or onto a support material 60, or any combination of the two. The support material 60 may be used during the printing process in order to support the printed material 25 as the layers 27 are built up to form the three-dimensional lens 90. An extrusion head 30 is configured to move along an extrusion head axis X in order to print the lens 90. As shown, the lens 90 is a concave lens, however lenses of virtually any shape, size, and configuration may be formed using this printing process.

Figure 3A:
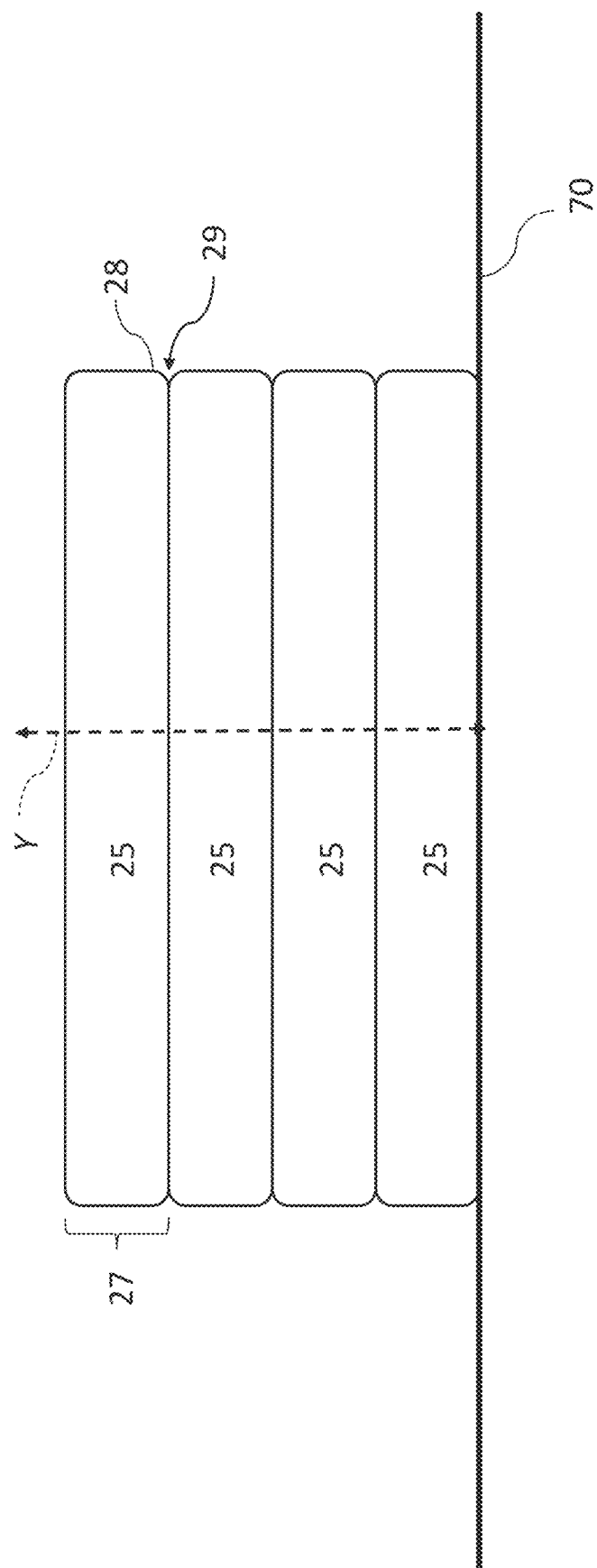
FIG. 3A is a schematic depiction of layers of printed material deposited on a work surface.

As shown in FIGS. 2A-C, a lens 90 is depicted at various stages of the printing process. FIG. 2A illustrates an early time point in the printing process showing the deposition of layers of material (indicated using horizontal lines) 27 forming a portion of the lens 90 with a support material 60 placed to support the printed material 25 as the layers are built up to form the lens 90. FIG. 2B shows a time point in the printing process where approximately 50% of the lens 90 is printed and FIG. 2C shows a completed or nearly completed lens 90. As can be seen, the extrusion head 30 and nozzle 40 are moved along the guide 12 and along the extrusion head axis X. Referring back to FIG. 1, it can be seen that the guide 12 is capable of moving the extrusion head 30 and nozzle 40 along axes Y and Z. As illustrated schematically in FIG. 3A, the printed material 25 is deposited in successive layers 27 and is built up along the axis Y according to the predetermined template or operating instructions. In some embodiments, an end of a layer 27 may be rounded or otherwise comprise a radii 28 defining indents or notches 29 between each layer 27. As the lens material 25 is being built up along the Y axis, it may also be built up along the Z axis as shown in FIG. 3B. FIG. 3B illustrates a top schematic view showing the guide 12 moving along the Z axis and enabling the deposition of lens material 25 by the nozzle through the extrusion head 30. In this manner a three dimensional lens 90 is fabricated.

Once the lens 90 is printed, it may then be put through one or more post printing or finishing steps in order to meet the final lens specifications. Post printing steps may include, but are not limited to, solvent washing, polishing, etching, sanding, grinding, or punching. In some embodiments, the printed material 25 may be comprised of one or more colors or even more than one material. The printed material may further include fillers or other additive in order to control the softness of the transmitted light.

Figure 4:
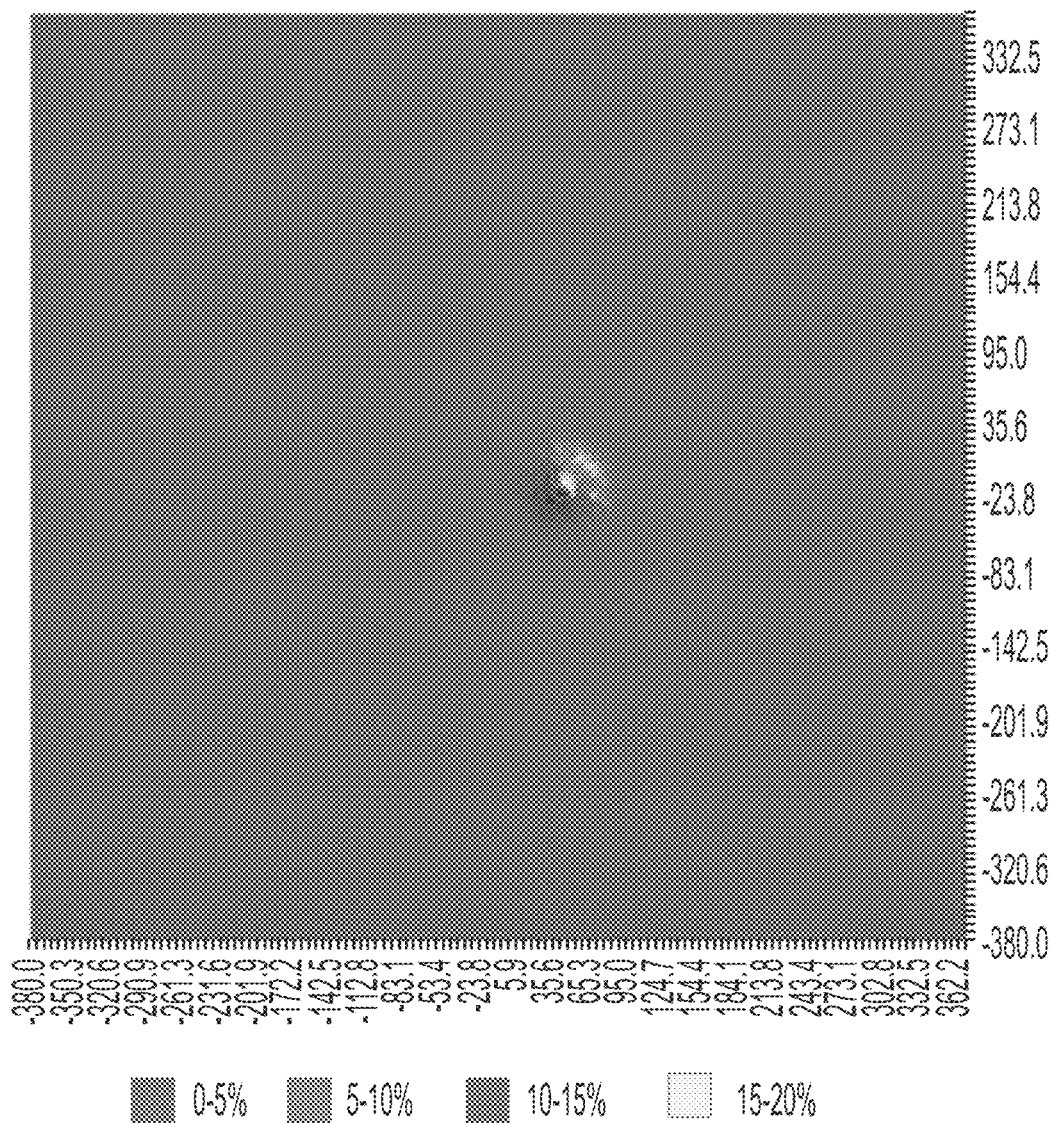
FIG. 4 is a depiction of transmission scattering of a non-printed acrylic lens.
Figure 5C:
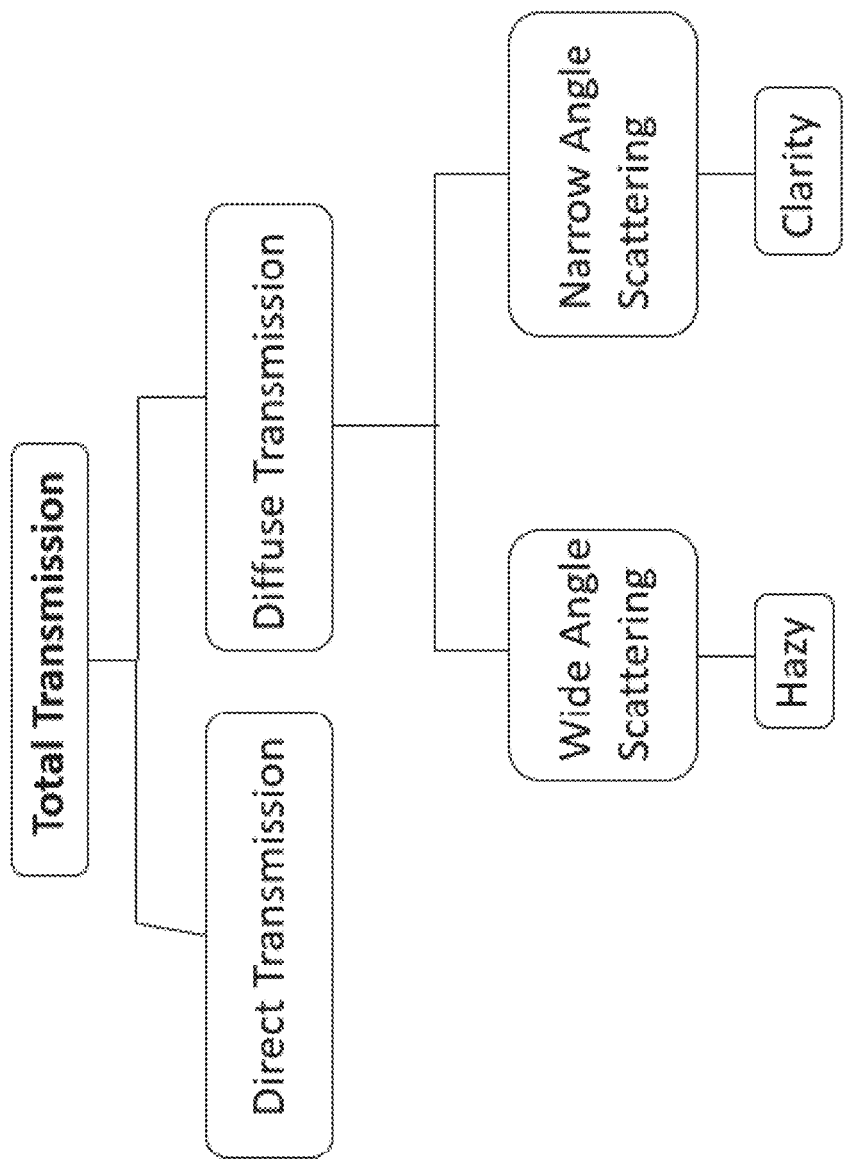
FIG. 5C is chart showing the influence of various printing parameters on light transmission scattering.

Printing a lens 90 using FDM enables production of lenses 90 with specific transmission scattering properties over traditional non-printed acrylic lenses. The optical properties of the printed lenses 90 may be changed by adjusting variables of the printing process (rather than changing the type of printed material) such as nozzle diameter and raster angle. Transmission scattering is a physical observation of light scattering from the surface of objects. FIG. 4, shows transmission scattering at a location on a non-printed acrylic lens. The location of the measurement on the lens is indicated along the X and Y axes. The center of the area of transmission exhibits about 15-20% transmission and there is minimal light scattering. In contrast, the transmission scattering of an embodiment of a lens 90 made using FDM is shown in FIGS. 5A-1, 5A-2, 5B-1 and 5B-2. As was previously mentioned, the FDM printed lenses can be configured to exhibit different levels of transmission scattering. FIGS. 5A-1 and 5A-2 show an embodiment of lens having a smooth surface and exhibiting a +45° transmission scattering at the location measured. FIGS. 5B-1 and 5B-2 comprise a rough surface and exhibits a −45° transmission scattering at the location measured. Similar to FIG. 4, the location of the measurement on the lens is indicated in the X and Y axes and the light transmission rate ranges from about 0-20% transmission. Light transmission scattering can be further controlled by various printing parameters to obtain a clear (crystal clear) or hazy lens (diffused or softer light) as referenced in FIG. 5C. For example, the total transmission could be a function of direct transmission, where there is no lens used, or a diffuse transmission, where a lens is used to affect light transmission scattering.

Figure 6:
FIG. 6 is a reference label as seen by the naked eye.
Figure 7A:
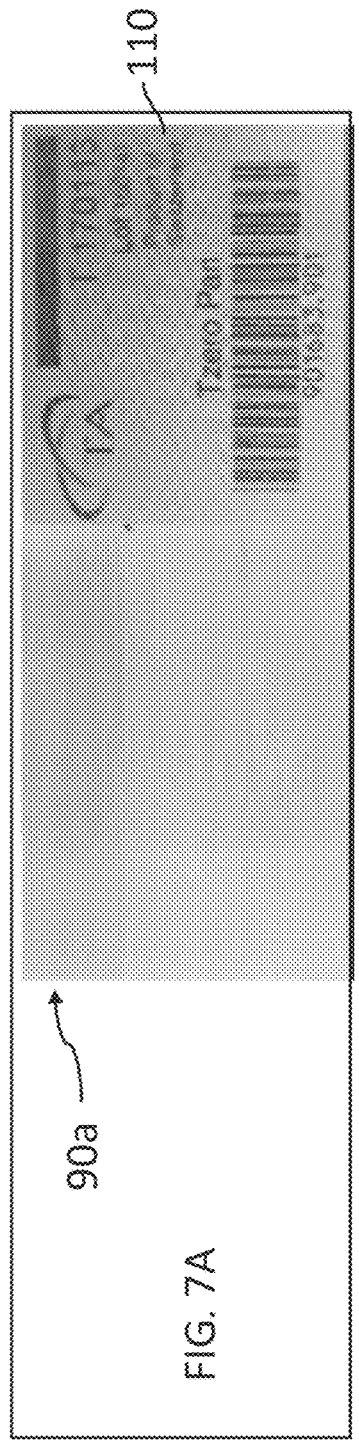
FIGS. 7A-C show three examples of how varying printing certain parameters changes the optical characteristics of the printed lenses.
Figure 7B:
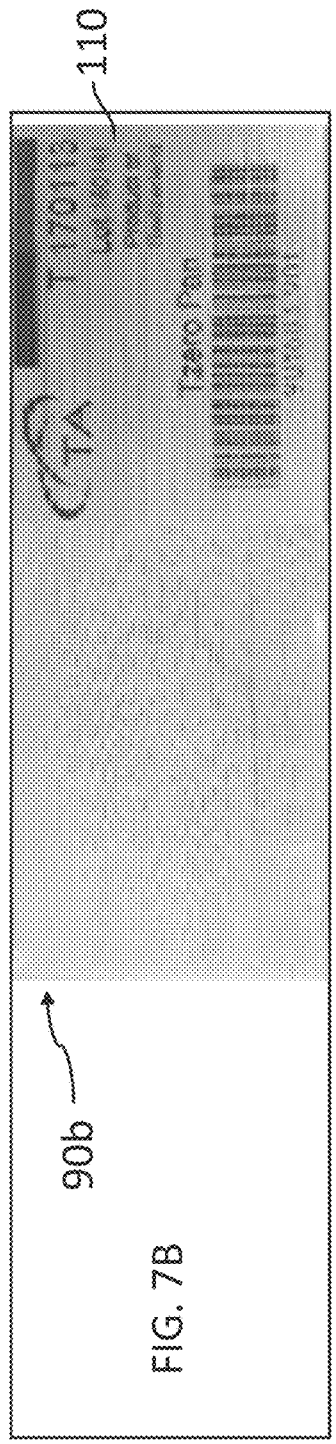
Figure 7C:
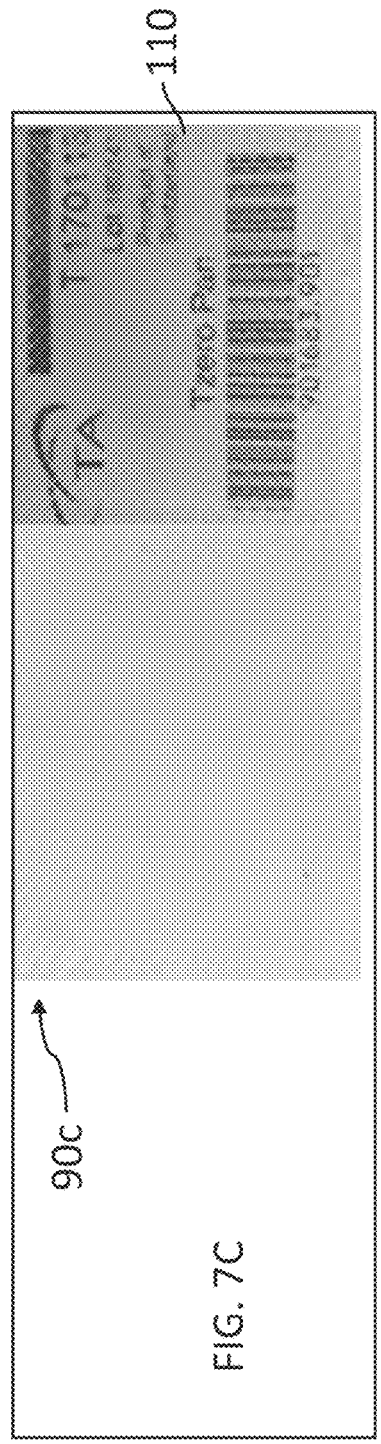

The effects of light transmission will now be discussed with reference to FIGS. 6-7C. FIG. 6 shows a reference label 110 as seen by the naked eye. FIG. 7A shows the reference label 110 of FIG. 6 placed under a transparent nylon, FDM printed lens 90a. The lens 90a was printed with a 0.4 mm nozzle that was oriented at a raster angle of 0° with regard to the work surface 70. As can be seen, this combination produces a somewhat grainy image of the reference label 110 of FIG. 6 when viewed through the lens 90a. The lens 90b of FIG. 7B uses a larger diameter nozzle (0.8 mm) than in FIG. 7A, but the same raster angle. As can be seen, this combination results in a more streaky image of the reference label 110 when viewed the lens 90b. Finally, FIG. 7C shows a transparent nylon, FDM printed lens 90c using the same nozzle as FIG. 7B, but with a raster angle of +45° and −45°. The result is a somewhat pixilated image of the reference label 110 when viewed through the lens 90c of FIG. 7C. Accordingly, each of these lenses 90a, 90b, 90c exhibits different light transmission scattering patterns as is experienced when viewing the label 110 through them. This illustrates the multitude of variations that can quickly be employed to print a variety of different lenses 90 with different optical characteristics.

Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure.

What is claimed is:

1. A method of manufacturing a three-dimensional lens for a luminary using an additive manufacturing process, the method comprising:
   inputting a lens template into a controller of a printer;
   depositing a first filamentous layer of transparent polyamide material onto a work surface according to the lens template; and
   successively depositing additional filamentous layers of the transparent polyamide material onto the first filamentous layer according to the lens template to build the three-dimensional lens
   wherein the lens template stipulates a nozzle diameter and a raster angle of the printer to achieve a transmission scattering profile for transmitted light.

2. The method of claim 1, further comprising at least one post-printing process.

3. The method of claim 1, wherein one or more fillers are added to the transparent polyamide material in order to control softness of the transmitted light.

4. The method of claim 3, wherein the transparent polyamide material is tinted a color.

5. The method of claim 1, wherein the three-dimensional lens comprises one or more smooth surfaces.

6. The method of claim 1, wherein at least a portion of the three-dimensional lens is built on a support material, and wherein the support material is removed after the depositing is completed.

7. The method of claim 1, wherein the first filamentous layer and the additional filamentous layers are substantially parallel to each other.

8. A method of manufacturing a three-dimensional lens, the method comprising:
   inputting a lens template into a controller of a printer;
   depositing a first layer of lens material onto a work surface according to the lens template; and
   successively depositing additional layers of the lens material onto the first layer according to the lens template to build the three-dimensional lens, wherein a transmission scattering profile for transmitted light is part of the lens template, and wherein the lens template stipulates a nozzle diameter and a raster angle of the printer to achieve the transmission scattering profile.

9. The method of claim 8, wherein the lens is for a luminary.

10. The method of claim 8, wherein the lens material is a transparent polyamide material.

11. The method of claim 10, wherein one or more fillers are added to the transparent polyamide material in order to control softness of the transmitted light.

12. The method of claim 11, wherein the transparent polyamide material is tinted a color.

13. The method of claim 8, further comprising at least one post-printing process.

14. The method of claim 8, wherein at least a portion of the three-dimensional lens is built on a support material, and wherein the support material is removed after the depositing of the lens material is completed.

15. The method of claim 8, wherein the first layer and the additional layers are substantially parallel to each other.

* * * * *